United States Patent
Strengert et al.

(10) Patent No.: US 11,584,346 B2
(45) Date of Patent: Feb. 21, 2023

(54) MULTI-CIRCUIT HYDRAULICALLY CLOSED BRAKING SYSTEM

(71) Applicant: Robert Bosch GmbH, Stuttgart (DE)

(72) Inventors: Stefan Strengert, Stuttgart (DE); Thomas Friedrich, Ingersheim (DE); Dirk Drotleff, Oberstenfeld-Gronau (DE); Ralf Kleemann, Benningen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 334 days.

(21) Appl. No.: 16/975,295

(22) PCT Filed: Jan. 7, 2019

(86) PCT No.: PCT/EP2019/050234
§ 371 (c)(1),
(2) Date: Aug. 24, 2020

(87) PCT Pub. No.: WO2019/161980
PCT Pub. Date: Aug. 29, 2019

(65) Prior Publication Data
US 2020/0398805 A1 Dec. 24, 2020

(30) Foreign Application Priority Data
Feb. 26, 2018 (DE) .................... 10 2018 202 887.7

(51) Int. Cl.
*B60T 13/66* (2006.01)
*B60T 13/68* (2006.01)
*B60T 8/48* (2006.01)

(52) U.S. Cl.
CPC .......... *B60T 13/662* (2013.01); *B60T 13/686* (2013.01); *B60T 8/4872* (2013.01); *B60T 2270/402* (2013.01); *B60Y 2400/81* (2013.01)

(58) Field of Classification Search
CPC .... B60T 13/662; B60T 8/4872; B60T 13/686; B60T 2270/402; B60Y 2400/81
See application file for complete search history.

(56) References Cited

U.S. PATENT DOCUMENTS

| | | | |
|---|---|---|---|
| 11,148,651 B2* | 10/2021 | Hienz | B60T 7/12 |
| 2014/0203626 A1* | 7/2014 | Biller | B60T 13/58 |
| | | | 303/14 |

(Continued)

FOREIGN PATENT DOCUMENTS

| | | |
|---|---|---|
| CN | 105813911 A | 7/2016 |
| DE | 10 2009 001 135 A1 | 8/2010 |

(Continued)

OTHER PUBLICATIONS

International Search Report corresponding to PCT Application No. PCT/EP2019/050234, dated Apr. 3, 2019 (German and English language document) (5 pages).

*Primary Examiner* — Pamela Rodriguez
(74) *Attorney, Agent, or Firm* — Maginot, Moore & Beck LLP

(57) ABSTRACT

A multi-circuit hydraulically closed braking system includes at least two wheel brakes, which are each associated with a braking circuit, two multi-circuit pressure generators, which are connected hydraulically in series between a fluid container and the at least two wheel brakes, and a hydraulic unit for hydraulic connection of the pressure generators to the at least two wheel brakes and for individual brake pressure modulation in the at least two wheel brakes. A first pressure generator is configured as a plunger system and is associated with a primary system which comprises a first power supply and a first evaluation and control unit for controlling the first pressure generator. A second pressure generator is configured as a pump system and is associated with a secondary (Continued)

system, which comprises a second power supply, independent of the first power supply, and a second evaluation and control unit.

20 Claims, 2 Drawing Sheets

(56) References Cited

U.S. PATENT DOCUMENTS

| | | | |
|---|---|---|---|
| 2015/0175146 A1* | 6/2015 | Quirant | B60T 7/042 |
| | | | 303/14 |
| 2016/0214582 A1* | 7/2016 | Brenn | B60T 7/042 |
| 2017/0001612 A1* | 1/2017 | Bauer | B60T 8/4081 |
| 2017/0072920 A1* | 3/2017 | Besier | B60T 8/4081 |
| 2017/0282877 A1* | 10/2017 | Besier | B60T 8/885 |
| 2020/0406878 A1* | 12/2020 | Friedrich | B60T 13/662 |
| 2021/0039616 A1* | 2/2021 | Friedrich | B60T 8/326 |

FOREIGN PATENT DOCUMENTS

| | | |
|---|---|---|
| DE | 10 2013 227 066 A1 | 6/2015 |
| DE | 10 2015 206 572 A1 | 11/2015 |
| DE | 10 2016 201 261 A1 | 7/2016 |
| WO | 2010/097134 A1 | 9/2010 |

* cited by examiner

MULTI-CIRCUIT HYDRAULICALLY CLOSED BRAKING SYSTEM

This application is a 35 U.S.C. § 371 National Stage Application of PCT/EP2019/050234, filed on Jan. 7, 2019, which claims the benefit of priority to Serial No. DE 10 2018 202 887.7, filed on Feb. 26, 2018 in Germany, the disclosures of which are incorporated herein by reference in their entirety.

The disclosure proceeds from a multi-circuit hydraulically closed brake system, in particular for a highly automated or autonomous vehicle. The subject matter of the disclosure is also an operating method for a multi-circuit hydraulically closed brake system of this type.

Vehicles with at least one highly automated or autonomous driving function are known from the prior art, which vehicles can at least partially assume an actual driving task. As a result, the vehicles can drive in a highly automated or autonomous manner, by the vehicles, for example, automatically detecting the road course, other road users or obstacles, calculating the corresponding actuating commands in the vehicle, and forwarding them to the actuators in the vehicle, as a result of which the driving course of the vehicle is influenced correctly. In the case of a highly automated or autonomous vehicle of this type, the driver is as a rule not involved in the driving process. Nevertheless, measures and means are provided which make it possible for the driver to be able to intervene himself/herself in the driving process at any time.

In addition, brake systems for vehicles are known from the prior art, which brake systems are designed for an actuation by way of a vehicle driver by way of a hydraulic intervention. As a result, it is ensured in the case of failure of the brake system that the driver can still apply sufficient brake force to the wheels of the vehicle by way of actuation of the brake pedal. This design significantly influences the topology of current brake systems. Thus, for example, the size of a tandem brake master cylinder can be based on maintaining satisfactory performance on the fallback level. In addition, the brake systems can be configured as what are known as coupled brake systems or power brake systems. Said systems are also realized, however, in such a way that there is still a hydraulic intervention by way of the driver as fallback level. Power brake systems are unsuitable for highly automated or autonomous vehicles, since a driver is no longer present there for boosting purposes during an autonomous driving function and the brake system has to build up the brake energy in a completely independent manner.

DE 10 2009 001 135 A1 has disclosed a method for the actuation of a hydraulically closed vehicle brake system. The vehicle brake system comprises an electromechanical brake booster and a traction control system. Here, the vehicle brake system is actuated by way of the brake booster in situations in the case of which a brake pedal is not actuated, for example in order to limit a vehicle speed or for distance control with respect to a preceding vehicle or in the case of parking.

SUMMARY

The multi-circuit hydraulically closed brake system, in particular for a highly automated or autonomous vehicle, and the corresponding operating method for a multi-circuit hydraulically closed brake system of this type have the advantage that a simple, robust and inexpensive brake system architecture is provided without mechanical and/or hydraulic intervention via the driver, which brake system architecture makes sufficient brake performance possible by way of a suitable redundancy concept even in the case of a fault.

Embodiments of the disclosure have fewer components than known brake systems, since fewer valves, no pedal travel simulator, and no mechanism for generating, boosting and forwarding the driver pressure are required, with the result that lower brake system costs are produced. This additionally results in lower system costs, since there is only one hydraulic connector at the wheel brakes and no alternative solutions with two connectors in the brake caliper which act on different pistons are required. Furthermore, the fluid vessel has only one hydraulic connector per brake circuit and alternative solutions with a plurality of connectors are superfluous.

Moreover, this results in lower integration costs for the vehicle manufacturer, since the embodiments of the disclosure make a simple installation, in particular for right-hand drive and left-hand drive vehicles, possible on account of the electric actuation without mechanical and/or hydraulic intervention via the driver, and free up installation space on the bulkhead between the engine compartment and the vehicle interior compartment. Since none of the brake system actuators have to be mounted on the bulkhead, this can also result in NVH (Noise, Vibration, Harshness) advantages. In addition, the smaller number of components results in a lower weight and volume in comparison with known brake systems.

A modular concept with two modules can be implemented simply by way of the division into a main system and a secondary system.

Embodiments of the disclosure provide a multi-circuit hydraulically closed brake system, in particular for a highly automated or autonomous vehicle, with at least two wheel brakes which are assigned to in each case one brake circuit, two multi-circuit pressure generators which are connected hydraulically in series between a fluid vessel and the at least two wheel brakes, and a hydraulic unit for the hydraulic connection of the pressure generators to the at least two wheel brakes and for the individual brake pressure modulation in the at least two wheel brakes. Here, a first pressure generator is configured as a plunger system and is assigned to a main system which comprises a first energy supply and a first evaluation and control unit for the actuation of the first pressure generator. A second pressure generator is configured as a pump system and is assigned to a secondary system which comprises a second energy supply, which is independent of the first energy supply, and a second evaluation and control unit. In addition, the hydraulic unit is assigned to the secondary system, with the result that the components of the hydraulic unit and the second pressure generator are actuated by the second evaluation and control unit and are supplied with energy by the second energy supply.

In addition, an operating method for a multi-circuit hydraulically closed brake system of this type, in particular for a highly automated or autonomous vehicle, is proposed. Here, the main system increases or reduces or holds the pressure in the brake circuits by means of the first pressure generator in normal operation, and the secondary system carries out the individual brake pressure modulation in the at least two wheel brakes by means of the second pressure generator and the hydraulic unit. The secondary system, in the case of failure of the main system, increases or reduces or holds the pressure in the brake circuits by means of the second pressure generator and the hydraulic unit and carries out the individual brake pressure modulation in the at least two wheel brakes. In the case of failure of the secondary system, the main system increases or reduces or holds the pressure in the brake circuits and in the at least two wheel brakes by means of the first pressure generator, and the individual brake pressure modulation in the at least two wheel brakes is dispensed with.

A hydraulically closed brake system is understood to mean a brake system in the case of which brake fluid from the wheel brakes which is discharged during an individual brake pressure modulation can be stored in the hydraulic unit and can be fed back into the brake circuit again via the pump system of the secondary system. As a result, replenishment of brake fluid from the fluid vessel is advantageously not required in comparison with an open brake system, with the result that pressure holding phases during the replenishing operation can be dispensed with.

Various regulating functions, such as for example an anti-lock brake control system ABS, a traction control system ASR, a driving dynamics control system FDR or ESP, for longitudinal and transverse stabilization of the vehicle can be implemented in an advantageous way by way of the individual brake pressure modulation in the individual wheel brakes. Since said regulating functions are known per se, they will not be described in greater detail here.

In the case of failure of the main system, there is still the full ESP functionality with longitudinal and transverse stabilization in an advantageous way by way of embodiments of the disclosure. The embodiment of the first pressure generator as a plunger system results in satisfactory NVH performance in the entire system and simpler and/or more precise monitoring and improved regulation. This makes it possible that both positional and volumetric and pressure build-up information can be detected in the main system more simply and, in particular, more accurately in comparison with other concepts (pump system). The embodiment of the second pressure generator as a pump system results in even lower costs, installation space and weight in comparison with other concepts (plunger system).

In the present case, the evaluation and control unit can be understood to mean an electric unit, such as for example a control unit, which processes and/or evaluates detected sensor signals. The evaluation and control unit can have at least one interface which can be configured as hardware and/or software. In the case of a configuration as hardware, the interfaces can be, for example, part of what is known as a system ASIC which comprises a very wide variety of functions of the evaluation and control unit. It is also possible, however, that the interfaces are dedicated, integrated circuits or consist at least partially of discrete components. In the case of a configuration as software, the interfaces can be software modules which are present, for example, on a microcontroller in addition to other software modules. A computer program product with program code is also advantageous, which is stored on a machine-readable carrier such as a semiconductor memory, a hard disk memory or an optical memory and is used to carry out the evaluation when the program is executed by the evaluation and control unit.

Sensor units are provided for the detection of the sensor signals, which sensor units are understood in the present case to mean modules which comprise at least one sensor element which detects a physical variable and/or a change in a physical variable directly or indirectly and preferably converts it into an electric sensor signal. This can take place, for example, via the outputting and/or the receiving of acoustic waves and/or electromagnetic waves and/or via a magnetic field or the change in a magnetic field and/or the receiving of satellite signals, for example, of a GPS signal. A sensor unit of this type can comprise, for example, acceleration sensor elements which detect acceleration-relevant information of the vehicle, and/or sensor elements which determine objects and/or obstacles and/or other crash-relevant vehicle environment data and provide them for evaluation. Sensor elements of this type can be based, for example, on video technologies and/or radar technologies and/or LIDAR technologies and/or PMD technologies and/or ultrasonic technologies. In addition, signals and information of an existing ABS sensor system and the variables which are derived in the control unit which is provided for this purpose can also be evaluated. In a manner which is based on the acceleration-relevant information and/or variables which are determined therefrom, for example, a vehicle movement and a vehicle position can be estimated in three-dimensional space and can be evaluated for accident detection.

For determining the position of the vehicle, for example, GNSS (Global Navigation Satellite System) systems can be used. Here, GNSS is used as a collective term for the use of existing and future global satellite systems such as NAVSTAR GPS (Global Positioning System) of the United States of America, GLONASS (Global Navigation Satellite System) of the Russian Federation, Galileo of the European Union, BeiDou of the People's Republic of China, etc.

A highly automated or autonomous vehicle is understood to mean a vehicle which has at least one highly automated or autonomous driving function which can assume an actual driving task at least partially. Via said at least one highly automated or autonomous driving function, the vehicle detects, for example, the road course, other road users or obstacles automatically, and calculates the corresponding actuating commands which are forwarded to the actuators in the vehicle, as a result of which the driving course of the vehicle is influenced correctly. In the case of a highly automated or autonomous vehicle of this type, the driver is as a rule not involved in the driving process. Nevertheless, measures and means, for example in the form of electric or electronic actuating elements, are provided which make it possible for the driver to be able to intervene himself/herself in the driving process at any time. The braking request which is generated by the driver by means of the actuating elements is then forwarded via electric signals to the main system and/or the secondary system. There is, however, no mechanical and/or hydraulic intervention by way of the driver.

In order to plan the trajectory, the at least one driving function evaluates vehicle data which are detected by internal sensor units such as ABS interventions, steering angle, position, direction, speed, acceleration, etc. and/or vehicle environmental data which are detected, for example, via camera units, radar units, LIDAR units and/or ultrasonic sensor units, and actuates the evaluation and control units of the main system and of the secondary system accordingly, in order to generate a desired braking pressure and/or to realize stabilization operations in the longitudinal and/or transverse direction by way of individual brake pressure modulation in the wheel brakes.

Advantageous improvements of the multi-circuit hydraulically closed brake system, in particular for a highly automated or autonomous vehicle, and of the operating method for a multi-circuit hydraulically closed brake system of this type, in particular for a highly automated or autonomous vehicle, are possible by way of the measures and developments which are disclosed herein.

It is particularly advantageous that the fluid vessel can comprise a first fluid chamber for the fluid supply of a first brake circuit and a second fluid chamber for the fluid supply of a second brake circuit. In addition, the plunger system can have a piston/cylinder unit with two pistons and two chambers and with a drive which can move the two pistons counter to the force of corresponding restoring springs for setting the pressure in the chambers. Here, a first chamber can be assigned to the first brake circuit and a second chamber can be assigned to the second brake circuit, it being possible for flow to pass through the piston/cylinder unit in the currentless state of the first pressure generator, with the result that brake fluid can be conveyed from the fluid vessel through the first pressure generator to the second pressure generator. Furthermore, the pump system can have a first pump which can be assigned to the first brake circuit, a second pump which can be assigned to the second brake circuit, and a common drive which drive the two pumps. As a result, a continuous dual circuit nature from the fluid vessel as far as the wheel brakes can be implemented in an advantageous way, with the result that the requirements of the leakage monitoring system can be lowered.

In one advantageous refinement of the brake system, for each wheel brake, the hydraulic unit can comprise in each case one inlet valve and in each case one outlet valve and, for each brake circuit, can comprise in each case one pressure holding and pressure regulating valve, in each case one high pressure switching valve and in each case one low pressure accumulator. The inlet valves and the pressure holding and pressure regulating valves can be configured, for example, as controllable normally open solenoid valves. The outlet valves and the high pressure switching valves can be configured, for example, as electromagnetic normally closed switching valves. By way of said embodiment of the hydraulic unit, it is possible in an advantageous way for ESP systems which are already known to be used and for very low overall system costs to be achieved via an already existing economy of scale (ESP has been installed millions of times). Furthermore, a first wheel brake and a second wheel brake can be assigned to the first brake circuit, and a third wheel brake and a fourth wheel brake can be assigned to the second brake circuit. Here, both an X-split, that is to say the wheel brake of the left-hand front wheel and the wheel brake of the right-hand rear wheel are assigned to the first brake circuit, and the wheel brake of the right-hand front wheel and the wheel brake of the left-hand rear wheel are assigned to the second brake circuit, and an II-split, that is to say the wheel brake of the left-hand front wheel and the wheel brake of the left-hand rear wheel are assigned to the first brake circuit, and the wheel brake of the right-hand front wheel and the wheel brake of the right-hand rear wheel are assigned to the second brake circuit, of the brake circuits are possible.

In one advantageous refinement of the operating method, in normal operation or in the case of failure of the secondary system, the pressure holding and pressure regulating valves can be transferred into the normally open state for the pressure increase or for the pressure reduction in the brake circuits, and the drive of the plunger system can be actuated, in order to move the pistons in a first direction in order to increase the pressure in the brake circuits, or to move them in a second direction which is opposed to the first direction in order to reduce the pressure in the brake circuits. In addition, in normal operation or in the case of failure of the secondary system, the pressure holding and pressure regulating valves can be transferred into the normally open state in order to hold the pressure in the brake circuits, it being possible for the drive of the plunger system to hold the pistons in their current position.

In a further advantageous refinement of the operating method, in the case of failure of the main system, the pressure holding and pressure regulating valves can be closed and the high pressure switching valves can be opened in order to increase the pressure in the brake circuits, and the drive of the second pressure generator can be actuated, in order to increase the pressure by means of the pumps. In addition, in the case of failure of the main system, the pressure holding and pressure regulating valves can be opened in order to reduce the pressure in the brake circuits. Furthermore, in the case of failure of the main system, the pressure holding and pressure regulating valves can be closed in order to hold the pressure in the brake circuits.

In a further advantageous refinement of the operating method, in normal operation or in the case of failure of the main system, the associated inlet valve can be opened and the associated outlet valve can be closed for the individual pressure increase in an associated wheel brake. In addition, in normal operation or in the case of failure of the main system, the associated inlet valve and the associated outlet valve can be closed in order to hold the pressure individually in an associated wheel brake. Furthermore, in normal operation or in the case of failure of the main system, the associated inlet valve can be closed and the associated outlet valve can be opened for the individual pressure reduction in an associated wheel brake.

In a further advantageous refinement of the operating method, in the case of a detected leak in a wheel brake, the associated inlet valve can be closed.

One exemplary embodiment of the disclosure is shown in the drawing and will be described in greater detail in the following description. In the drawing, identical designations denote components or elements which carry out identical or analogous functions.

DETAILED DESCRIPTION

Figure 1:
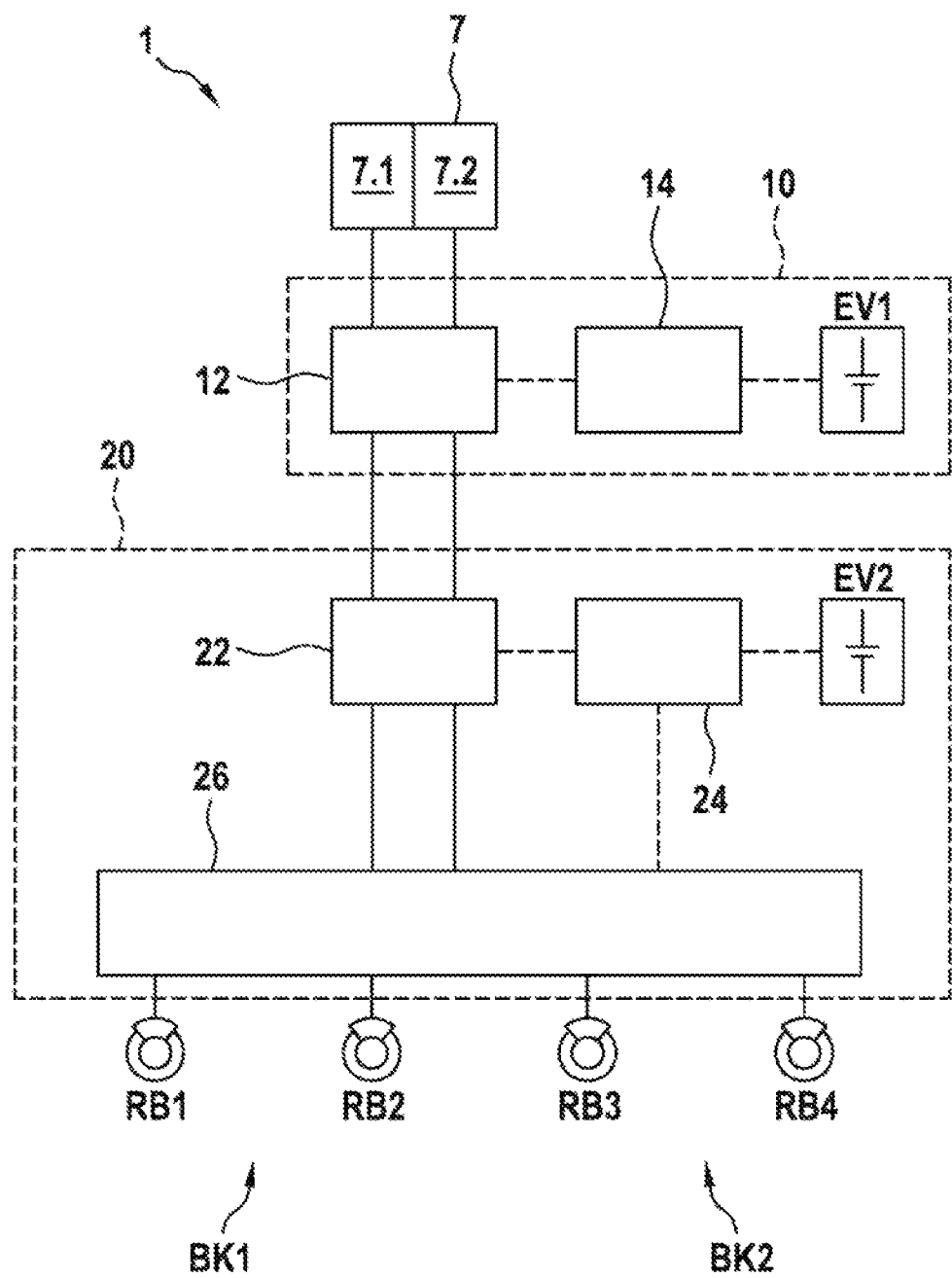
FIG. 1 shows a diagrammatic block diagram of one exemplary embodiment of a multi-circuit hydraulically closed brake system according to the disclosure, in particular for a highly automated or autonomous vehicle.
Figure 2:
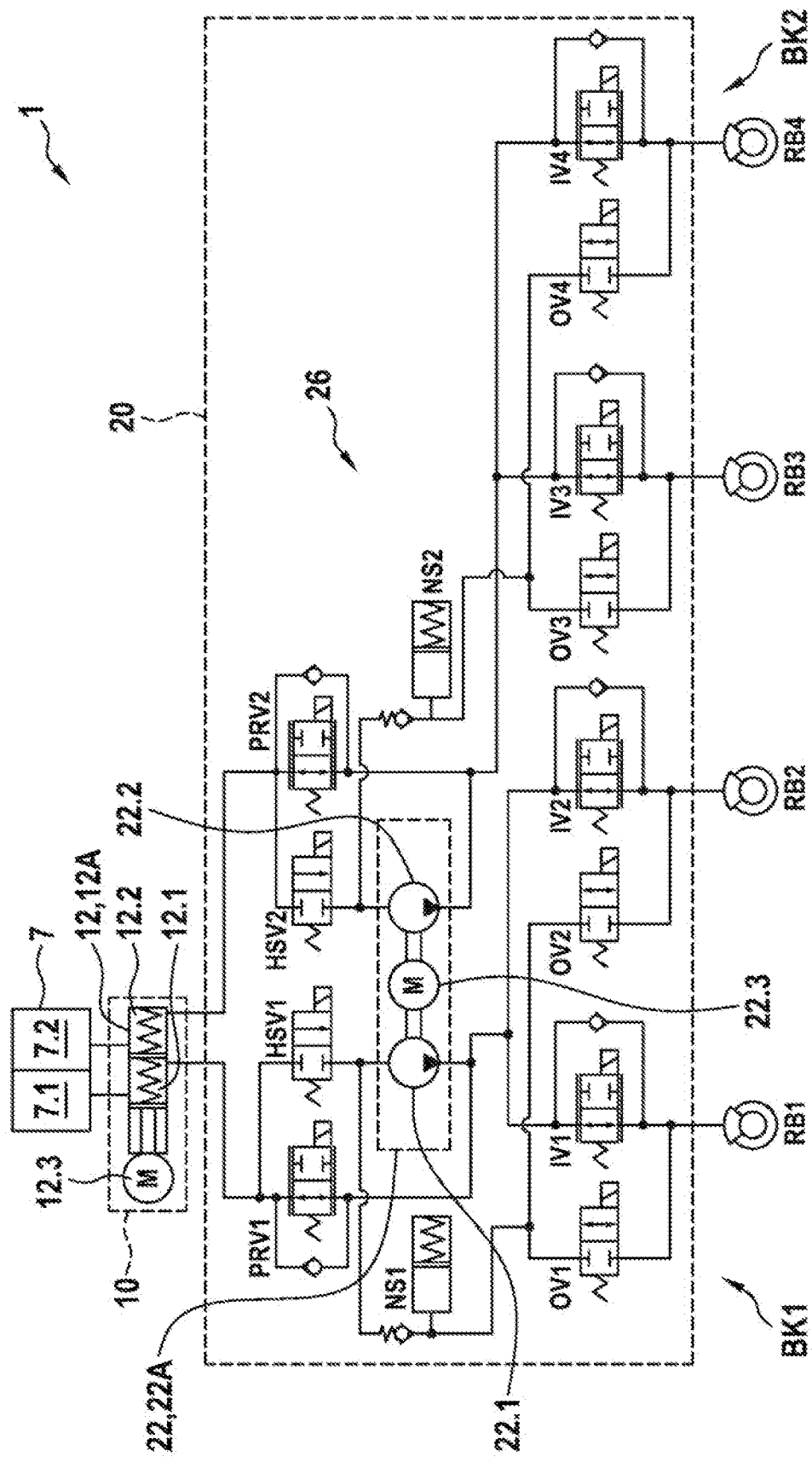
FIG. 2 shows a diagrammatic hydraulic circuit diagram of the brake system from FIG. 1.

As can be seen from FIGS. 1 and 2, the exemplary embodiment which is shown of a multi-circuit hydraulically closed brake system 1 according to the disclosure, in particular for a highly automated or autonomous vehicle, comprises at least two wheel brakes RB1, RB2, RB3, RB4 which are assigned to in each case one brake circuit BK1, BK2, two multi-circuit pressure generators 12, 22 which are connected hydraulically in series between a fluid vessel 7 and the at least two wheel brakes RB1, RB2, RB3, RB4, and a hydraulic unit 26 for the hydraulic connection of the pressure generators 12, 22 to the at least two wheel brakes RB1, RB2, RB3, RB4 and for the individual brake pressure modulation in the at least two wheel brakes RB1, RB2, RB3, RB4. As can be seen from FIG. 2, furthermore, a first pressure generator 12 is configured as a plunger system 12A and is assigned to a main system 10 which comprises a first energy supply EV1 and a first evaluation and control unit 14 for the actuation of the first pressure generator 12, as can be seen from FIG. 1, furthermore. As can be seen from FIG. 2, furthermore, a second pressure generator 22 is configured as a pump system 22A and is assigned to a secondary system 20 which comprises a second energy supply EV2, which is independent of the first energy supply EV1, and a second evaluation and control unit 24, as can be seen from FIG. 1, furthermore. Here, the hydraulic unit 26 is assigned to the secondary system 20, with the result that the components of the hydraulic unit 26 and the second pressure generator 22 are actuated by the second evaluation and control unit 24 and are supplied with energy by the second energy supply EV2.

As can be seen from FIGS. 1 and 2, furthermore, the brake system 1 which is shown comprises two brake circuits BK1, BK2 and four wheel brakes RB1, RB2, RB3, RB4, a first wheel brake RB1 and a second wheel brake RB2 being assigned to a first brake circuit BK1, and a third wheel brake RB3 and a fourth wheel brake RB4 being assigned to a second brake circuit. Here, an X-split of the wheel brakes RB1, RB2, RB3, RB4 to the two brake circuits BK1, BK2 is possible, that is to say the first wheel brake RB1 is arranged at the left-hand front wheel and the second wheel brake RB2 is arranged at the right-hand rear wheel, and the third wheel brake RB2 is arranged at the right-hand front wheel and the fourth wheel brake RB4 is arranged at the left-hand rear wheel. As an alternative, an II-split of the wheel brakes RB1, RB2, RB3, RB4 to the two brake circuits BK1, BK2 is also possible, that is to say the first wheel brake RB1 is arranged at the left-hand front wheel and the second wheel brake RB2 is arranged at the left-hand rear wheel, and the third wheel brake RB2 is arranged at the right-hand front wheel and the fourth wheel brake RB4 is arranged at the right-hand rear wheel.

As can be seen from FIGS. 1 and 2, furthermore, the fluid vessel 7 in the exemplary embodiment which is shown comprises a first fluid chamber 7.1 for the fluid supply of the first brake circuit BK1 and a second fluid chamber 7.2 for the fluid supply of the second brake circuit BK2.

As can be seen from FIG. 2, furthermore, the plunger system 12A in the exemplary embodiment which is shown has a piston/cylinder unit with two pistons and two chambers 12.1, 12.2 and with a drive 12.3 which is configured as an electric motor and moves the two pistons counter to the force of corresponding restoring springs for setting the pressure in the chambers 12.1, 12.2. Here, a first chamber 12.1 is assigned to the first brake circuit BK1, and a second chamber 12.2 is assigned to the second brake circuit BK2. In addition, the piston/cylinder unit is configured such that flow can pass through it in the currentless state of the first pressure generator 12, with the result that brake fluid can be conveyed out of the fluid vessel 7 through the first pressure generator 22 to the second pressure generator 22.

As can be seen from FIG. 2, furthermore, the pump system 22A in the exemplary embodiment which is shown has a first pump 22.1 which is assigned to the first brake circuit BK1, a second pump 22.2 which is assigned to the second brake circuit BK2, and a common drive 22.3 which is configured as an electric motor and drives the two pumps 22.1, 22.2.

As can be seen from FIG. 2, furthermore, the hydraulic unit 26 in the exemplary embodiment which is shown comprises in each case one inlet valve IV1, IV2, IV3, IV4 and in each case one outlet valve OV1, OV2, OV3, OV4 for each wheel brake RB1, RB2, RB3, RB4, a first inlet valve IV1 and a first outlet valve OV1 being assigned to the first wheel brake RB1. A second inlet valve IV2 and a second outlet valve OV2 are assigned to the second wheel brake RB2. A third inlet valve IV3 and a third outlet valve OV3 are assigned to the third wheel brake RB3, and a fourth inlet valve IV4 and a fourth outlet valve OV4 are assigned to the fourth wheel brake RB4. In addition, for each brake circuit BK1, the hydraulic unit 26 comprises in each case one pressure holding and pressure regulating valve PRV1, PRV2, in each case one high pressure switching valve HSV1, HSV2 and in each case one low pressure accumulator NS1, NS2. Here, a first pressure holding and pressure regulating valve PRV1 and a first high pressure switching valve HSV1 and a first low pressure accumulator NS1 are assigned to the first brake circuit BK1, and a second pressure holding and pressure regulating valve PRV2 and a second high pressure switching valve HSV2 and a second low pressure accumulator NS2 are assigned to the second brake circuit BK2.

As can be seen from FIG. 2, furthermore, the inlet valves IV1, IV2, IV3, IV4 and the pressure holding and pressure regulating valves PRV1, PRV2 are configured in the exemplary embodiment which is shown in each case as controllable normally open solenoid valves. The outlet valves OV1, OV2, OV3, OV4 and the high pressure switching valves HSV1, HSV2 are configured in the exemplary embodiment which is shown as electromagnetic normally closed switching valves.

Since the brake system 1 according to the disclosure is configured as a hydraulically closed system, brake fluid which is discharged via an associated outlet valve OV1, OV2, OV3, OV4 during an individual brake pressure modulation in a wheel brake RB1, RB2, RB3, RB4 from the wheel brakes RB1, RB2, RB3, RB4 is stored in the exemplary embodiment which is shown in an associated low pressure accumulator NS1, NS2, and is returned again into the brake circuit BK1, BK2 via the associated pump 22.1, 22.2 of the pump system 22 above the inlet valves IV1, IV2, IV3, IV4. In the exemplary embodiment which is shown, the brake fluid which is discharged from the wheel brakes RB1, RB2 of the first brake circuit BK1 via the outlet valves OV1, OV2 is stored in the first low pressure accumulator NS1, and is fed to the first brake circuit BK1 again via the first pump 22.1 above the inlet valves IV1, IV2. The brake fluid which is discharged from the wheel brakes RB3, RB4 of the second brake circuit BK2 via the outlet valves OV3, OV4 is stored in the second low pressure accumulator NS2, and is fed to the second brake circuit BK2 again via the second pump 22.2 above the inlet valves IV3, IV4.

In the case of the operating method according to the disclosure for the above-described multi-circuit hydraulically closed brake system 1, in particular for a highly automated or autonomous vehicle, the main system 10 increases or reduces or holds the pressure in the brake circuits BK1, BK2 by means of the first pressure generator 12 in normal operation. In addition, in normal operation, the secondary system 20 carries out the individual brake pressure modulation in the wheel brakes RB1, RB2, RB3, RB4 by means of the second pressure generator 22 and the hydraulic unit 26. In the case of failure of the main system 10, the secondary system 20 increases or reduces or holds the pressure in the brake circuits BK1, BK2 by means of the second pressure generator 22 and the hydraulic unit 26, and carries out the individual brake pressure modulation in the at least two wheel brakes RB1, RB2, RB3, RB4. In the case of failure of the secondary system 20, the main system 10 increases or reduces or holds the pressure in the brake circuits BK1, BK2 and in the wheel brakes RB1, RB2, RB3, RB4 by means of the first pressure generator 12, and the individual brake pressure modulation in the wheel brakes RB1, RB2, RB3, RB4 is dispensed with.

In normal operation or in the case of failure of the secondary system 20, the pressure holding and pressure regulating valves PRV1, PRV2 are transferred into the normally open state in order to increase the pressure or to reduce the pressure in the brake circuits BK1, BK2, and the drive 12.3 of the plunger system 12A is actuated, in order to move the pistons in a first direction in order to increase the pressure in the brake circuits BK1, BK2, or to move them in a second direction which is opposed to the first direction in order to reduce the pressure in the brake circuits BK1, BK2. In addition, in normal operation or in the case of failure of the secondary system 20, the pressure holding and pressure regulating valves PRV1, PRV2 are transferred into the normally open state in order to hold the pressure in the brake circuits BK1, BK2, and the drive 12.3 of the plunger system 12A holds the pistons in their current position.

Furthermore, in the case of failure of the main system 10, the pressure holding and pressure regulating valves PRV1, PRV2 are closed and the high pressure switching valves HSV1, HSV2 are opened in order to increase the pressure in the brake circuits BK1, BK2. In addition, the drive 22.3 of the second pressure generator 22 is actuated, in order to increase the pressure in the brake circuits BK1, BK2 by means of the pumps 22.1, 22.2. Moreover, in the case of failure of the main system 10, the pressure holding and pressure regulating valves PRV1, PRV2 are opened in order to reduce the pressure in the brake circuits BK1, BK2. In the case of failure of the main system 10, the pressure holding and pressure regulating valves PRV1, PRV2 are closed in order to hold the pressure in the brake circuits BK1, BK2.

Furthermore, in normal operation or in the case of failure of the main system 10, the associated inlet valve IV1, IV2, IV3, IV4 is opened and the associated outlet valve OV1, OV2, OV3, OV4 is closed for the individual pressure increase in an associated wheel brake RB1, RB2, RB3, RB4. In normal operation or in the case of failure of the main system 10, the associated inlet valve IV1, IV2, IV3, IV4 and the associated outlet valve OV1, OV2, OV3, OV4 are closed in order to hold the pressure individually in an associated wheel brake RB1, RB2, RB3, RB4. In normal operation or in the case of failure of the main system 10, the associated inlet valve IV1, IV2, IV3, IV4 is closed and the associated outlet valve OV1, OV2, OV3, OV4 is opened for the individual pressure reduction in an associated wheel brake RB1, RB2, RB3, RB4.

Moreover, in the case of a detected leak in a wheel brake RB1, RB2, RB3, RB4, the associated inlet valve IV1, IV2, IV3, IV4 is closed.

Said method can be implemented, for example, in software or hardware or in a mixed form comprising software and hardware, for example in a control unit (10).

Embodiments of the present disclosure provide a multi-circuit hydraulically closed brake system without mechanical and/or hydraulic intervention by way of the driver, in particular for a highly automated or autonomous vehicle, and a corresponding operating method, the pressure generators which are used and are arranged in series hydraulically acting on all wheel brakes of the vehicle via the hydraulic unit by way of the hydraulic connection.

The invention claimed is:
1. A multi-circuit hydraulically closed brake system, comprising:
at least two wheel brakes, each of which is assigned to a corresponding brake circuit of a plurality of brake circuits;
a first multi-circuit pressure generator and a second multi-circuit pressure generator which are connected hydraulically in series between a fluid vessel and the at least two wheel brakes; and
a hydraulic unit configured (i) to connect hydraulically the first and the second pressure generators to the at least two wheel brakes, and (ii) to modulate individual brake pressure in the at least two wheel brakes,
wherein the first pressure generator is configured as a plunger system and is assigned to a main system which comprises a first energy supply and a first evaluation and control unit configured to actuate the first pressure generator,
wherein the second pressure generator is configured as a pump system and is assigned to a secondary system which comprises a second energy supply, which is independent of the first energy supply, and a second evaluation and control unit,
wherein the hydraulic unit is assigned to the secondary system, such that components of the hydraulic unit and the second pressure generator are actuated by the second evaluation and control unit and are supplied with energy by the second energy supply,
wherein, in normal operation, the first evaluation and control unit is configured to operate the first pressure generator to increase, reduce, or hold pressure in the plurality of brake circuits and the second evaluation and control unit is configured to operate the second pressure generator and the hydraulic unit to carry out individual brake pressure modulation in the at least two wheel brakes,
wherein, upon failure of the main system, the second evaluation and control unit is configured to (i) operate the second pressure generator to increase, reduce, or hold pressure in the plurality of brake circuits and (ii) operate the secondary system to carry out the individual brake pressure modulation in the at least two wheel brakes, and
wherein, upon failure of the secondary system, the first evaluation and control unit is configured to (i) operate the first pressure generator to increase, reduce, or hold pressure in the plurality of brake circuits and (ii) the first and second evaluation and control units are configured to dispense with the individual brake pressure modulation in the at least two wheel brakes.

2. The brake system as claimed in claim 1, wherein:
a first wheel brake of the at least two wheel brakes is assigned to a first brake circuit of the plurality of brake circuits,
a second wheel brake of the at least two wheel brakes is assigned to a second brake circuit of the plurality of brake circuits,
the fluid vessel comprises (i) a first fluid chamber configured to supply fluid to the first brake circuit, and (ii) a second fluid chamber configured to supply fluid to the second brake circuit.

3. The brake system as claimed in claim 2, wherein the plunger system includes (i) a piston/cylinder unit with two pistons and two chambers, and (ii) a drive configured to move the two pistons counter to force of corresponding restoring springs that set a pressure in the two chambers.

4. The brake system as claimed in claim 3, wherein:
a first chamber of the two chambers is assigned to the first brake circuit,
a second chamber of the two chambers is assigned to the second brake circuit, flow passes through the piston/cylinder unit in a currentless state of the first pressure generator, such that fluid is conveyed from the fluid vessel through the first pressure generator to the second pressure generator.

5. The brake system as claimed in claim 1, wherein:
a first wheel brake of the at least two wheel brakes is assigned to a first brake circuit of the plurality of brake circuits,
a second wheel brake of the at least two wheel brakes is assigned to a second brake circuit of the plurality of brake circuits, and
the pump system includes a first pump assigned to the first brake circuit, a second pump assigned to the second brake circuit, and a common drive configured to drive both the first and second pumps.

6. The brake system as claimed in claim 1, wherein for each of the at least two wheel brakes, the hydraulic unit comprises in each case one inlet valve and in each case one outlet valve and, for each of the plurality of brake circuits, comprises in each case one pressure holding and pressure regulating valve, in each case one high pressure switching valve and in each case one low pressure accumulator.

7. The brake system as claimed in claim 6, wherein the inlet valves and the pressure holding and pressure regulating valves are configured as controllable normally open solenoid valves.

8. The brake system as claimed in claim 6, wherein the outlet valves and the high pressure switching valves are configured as electromagnetic normally closed switching valves.

9. The brake system as claimed in claim 1, wherein:
the at least two wheel brakes includes a first wheel brake, a second wheel brake, a third wheel brake, and a fourth wheel brake,
the first wheel brake and the second wheel brake are assigned to a first brake circuit of the plurality of brake circuits, and
the third wheel brake and the fourth wheel brake are assigned to a second brake circuit of the plurality of brake circuits.

10. An operating method for a multi-circuit hydraulically closed brake system, comprising:
in normal operation:
increasing, reducing, or holding pressure in corresponding brake circuits with a first multi-circuit pressure generator of a main system; and
carrying out individual brake pressure modulation in at least two wheel brakes with a second multi-circuit pressure generator of a secondary system and a hydraulic unit, the at least two wheel brakes each operably connected to one of the corresponding brake circuits;
in a case of failure of the main system, (i) increasing, reducing, or holding the pressure in the corresponding brake circuits with the second pressure generator and the hydraulic unit, (ii) and carrying out the individual brake pressure modulation in the at least two wheel brakes with the secondary system; and
in a case of failure of the secondary system, (i) increasing, reducing, or holding the pressure in the brake circuits and in the at least two wheel brakes with the first pressure generator, and (ii) dispensing with the individual brake pressure modulation in the at least two wheel brakes,
wherein the first and the second pressure generators are connected hydraulically in series between a fluid vessel and the at least two wheel brakes, and
wherein the hydraulic unit is configured to connect hydraulically the first and the second pressure generators to the at least two wheel brakes,
wherein the first pressure generator is configured as a plunger system,
wherein the main system includes a first energy supply and a first evaluation and control unit configured to actuate the first pressure generator,
wherein the second pressure generator is configured as a pump system,
wherein the secondary system includes a second energy supply, which is independent of the first energy supply, and a second evaluation and control unit,
wherein the hydraulic unit is assigned to the secondary system, such that components of the hydraulic unit and the second pressure generator are actuated by the second evaluation and control unit and are supplied with energy by the second energy supply, and
wherein for each of the at least two wheel brakes, the hydraulic unit comprises in each case one inlet valve and in each case one outlet valve and, for each of the corresponding brake circuits, comprises in each case one pressure holding and pressure regulating valve, in each case one high pressure switching valve and in each case one low pressure accumulator.

11. The operating method as claimed in claim 10, wherein:
the plunger system includes (i) a piston/cylinder unit with two pistons and two chambers, and (ii) a drive configured to move the two pistons counter to force of corresponding restoring springs that set a pressure in the two chambers, and
the method further comprises in normal operation or in the case of failure of the secondary system, transferring the pressure holding and pressure regulating valves into a normally open state for the pressure increase or for the pressure reduction in the brake circuits, and actuating the drive of the plunger system in order to move the two pistons in a first direction in order to increase the pressure in the brake circuits, or to move the two pistons in a second direction which is opposed to the first direction in order to reduce the pressure in the brake circuits.

12. The operating method as claimed in claim 10, wherein:
the plunger system includes (i) a piston/cylinder unit with two pistons and two chambers, and (ii) a drive configured to move the two pistons counter to force of corresponding restoring springs that set a pressure in the two chambers, and
the method further comprises in normal operation or in the case of failure of the secondary system, transferring the pressure holding and pressure regulating valves into the normally open state in order to hold the pressure in the brake circuits, the drive of the plunger system holding the two pistons in their current position.

13. The operating method as claimed in claim 10, wherein:
the plunger system includes (i) a piston/cylinder unit with two pistons and two chambers, and (ii) a drive configured to move the two pistons counter to force of corresponding restoring springs that set a pressure in the two chambers, and
wherein the method further comprises in the case of failure of the main system, closing the pressure holding and pressure regulating valves and opening the high pressure switching valves in order to increase the pressure in the brake circuits, and actuating a drive of the second pressure generator, in order to increase the pressure with the pump system.

14. The operating method as claimed in claim 10, further comprising:

in the case of failure of the main system, opening the pressure holding and pressure regulating valves in order to reduce the pressure in the brake circuits.

15. The operating method as claimed in claim 10, further comprising:

in the case of failure of the main system, closing the pressure holding and pressure regulating valves in order to hold the pressure in the brake circuits.

16. The operating method as claimed in claim 10, in normal operation or in the case of failure of the main system, opening the associated inlet valve and closing the associated outlet valve for the individual pressure increase in an associated wheel brake.

17. The operating method as claimed in claim 10, further comprising:

in normal operation or in the case of failure of the main system, closing the associated inlet valve and the associated outlet valve in order to hold the pressure individually in an associated wheel brake.

18. The operating method as claimed in claim 10, further comprising:

in normal operation or in the case of failure of the main system, closing the associated inlet valve and opening the associated outlet valve for the individual pressure reduction in an associated wheel brake.

19. The operating method as claimed in claim 10, further comprising:

closing the associated inlet valve when a leak in at least one of the at least two wheel brakes is detected.

20. A multi-circuit hydraulically closed brake system, comprising:

at least two wheel brakes, each of which is assigned to a corresponding brake circuit of a plurality of brake circuits;

a first multi-circuit pressure generator and a second multi-circuit pressure generator which are connected hydraulically in series between a fluid vessel and the at least two wheel brakes; and a hydraulic unit configured (i) to connect hydraulically the first and the second pressure generators to the at least two wheel brakes, and (ii) to modulate individual brake pressure in the at least two wheel brakes, wherein:

the first pressure generator is configured as a plunger system and is assigned to a main system which comprises a first energy supply and a first evaluation and control unit configured to actuate the first pressure generator, the second pressure generator is configured as a pump system and is assigned to a secondary system which comprises a second energy supply, which is independent of the first energy supply, and a second evaluation and control unit, the hydraulic unit is assigned to the secondary system, such that components of the hydraulic unit and the second pressure generator are actuated by the second evaluation and control unit and are supplied with energy by the second energy supply, a first wheel brake of the at least two wheel brakes is assigned to a first brake circuit of the plurality of brake circuits, a second wheel brake of the at least two wheel brakes is assigned to a second brake circuit of the plurality of brake circuits, the fluid vessel comprises (i) a first fluid chamber configured to supply fluid to the first brake circuit, and (ii) a second fluid chamber configured to supply fluid to the second brake circuit, the plunger system includes (i) a piston/cylinder unit with two pistons and two chambers, and (ii) a drive configured to move the two pistons counter to force of corresponding restoring springs that set a pressure in the two chambers, a first chamber of the two chambers is assigned to the first brake circuit, a second chamber of the two chambers is assigned to the second brake circuit, flow passes through the piston/cylinder unit in a currentless state of the first pressure generator, such that fluid is conveyed from the fluid vessel through the first pressure generator to the second pressure generator.

* * * * *